United States Patent
Bae et al.

(10) Patent No.: US 11,048,440 B2
(45) Date of Patent: Jun. 29, 2021

(54) MEMORY SYSTEM, MEMORY DEVICE AND OPERATING METHOD THEREOF

(71) Applicant: SK hynix Inc., Gyeonggi-do (KR)

(72) Inventors: Sung-Won Bae, Gyeonggi-do (KR); Jun-Hyuk Lee, Chungcheongbukdo (KR); Deung-Kak Yoo, Gyeonggi-do (KR); Min-Kyu Lee, Chungcheongbuk-do (KR)

(73) Assignee: SK hynix Inc., Gyeonggi-do (KR)

( * ) Notice: Subject to any disclaimer, the term of this patent is extended or adjusted under 35 U.S.C. 154(b) by 3 days.

(21) Appl. No.: 16/550,411

(22) Filed: Aug. 26, 2019

(65) Prior Publication Data

US 2020/0293227 A1 Sep. 17, 2020

(30) Foreign Application Priority Data

Mar. 14, 2019 (KR) .................. 10-2019-0029116

(51) Int. Cl.
*G06F 3/06* (2006.01)

(52) U.S. Cl.
CPC .......... *G06F 3/0659* (2013.01); *G06F 3/0604* (2013.01); *G06F 3/0634* (2013.01); *G06F 3/0673* (2013.01)

(58) Field of Classification Search
CPC .... G06F 3/0604; G06F 3/0634; G06F 3/0659; G06F 3/0673; G06F 3/06
See application file for complete search history.

(56) References Cited

U.S. PATENT DOCUMENTS

| | | | | |
|---|---|---|---|---|
| 9,286,208 B2* | 3/2016 | Ide | ...... | G06F 12/0246 |
| 9,396,775 B2* | 7/2016 | Shirakawa | ...... | G06F 3/061 |
| 9,911,479 B2* | 3/2018 | Jeong | ...... | G11C 7/22 |
| 2015/0262630 A1* | 9/2015 | Shirakawa | ...... | G06F 3/0634 |
| | | | | 711/125 |
| 2016/0179402 A1* | 6/2016 | Iwashiro | ...... | G06F 3/0688 |
| | | | | 711/103 |
| 2017/0018296 A1* | 1/2017 | Jeong | ...... | G11C 8/06 |
| 2018/0075910 A1* | 3/2018 | Seong | ...... | G11C 16/26 |
| 2019/0027221 A1* | 1/2019 | Hsu | ...... | G06F 1/3275 |
| 2019/0034081 A1* | 1/2019 | Shirakawa | ...... | G11C 16/10 |

OTHER PUBLICATIONS

H. Choi, J. Lee and W. Sung, "Memory access pattern-aware DRAM performance model for multi-core systems," (IEEE ISPASS) IEEE International Symposium on Performance Analysis of Systems and Software, Austin, TX, USA, 2011, pp. 66-75, doi: 10.1109/ISPASS.2011.5762716.*
Kim, S et al., A Write Buffer Management Scheme Exploiting the NCQ of SSDs, Aug. 2014, pp. 166-174.
Daum Blog, http://m.blog.daum.net/lks0018/3430807, Jan. 31, 2009.

* cited by examiner

*Primary Examiner* — Pierre Miche Bataille
(74) *Attorney, Agent, or Firm* — IP & T Group LLP

(57) ABSTRACT

A memory system includes a memory device having a plurality of memory blocks and a subcommand storage circuit, and a memory controller for controlling the memory device, wherein the memory device is capable of being in one or more of a ready state, a first busy state, and a second busy state, and wherein the subcommand is stored in the subcommand storage circuit when the subcommand is received from the memory controller in the first busy state and the subcommand is executable after the first busy state is released, and the subcommand stored in the subcommand storage circuit is executed after the memory device is changed to the ready state.

19 Claims, 13 Drawing Sheets

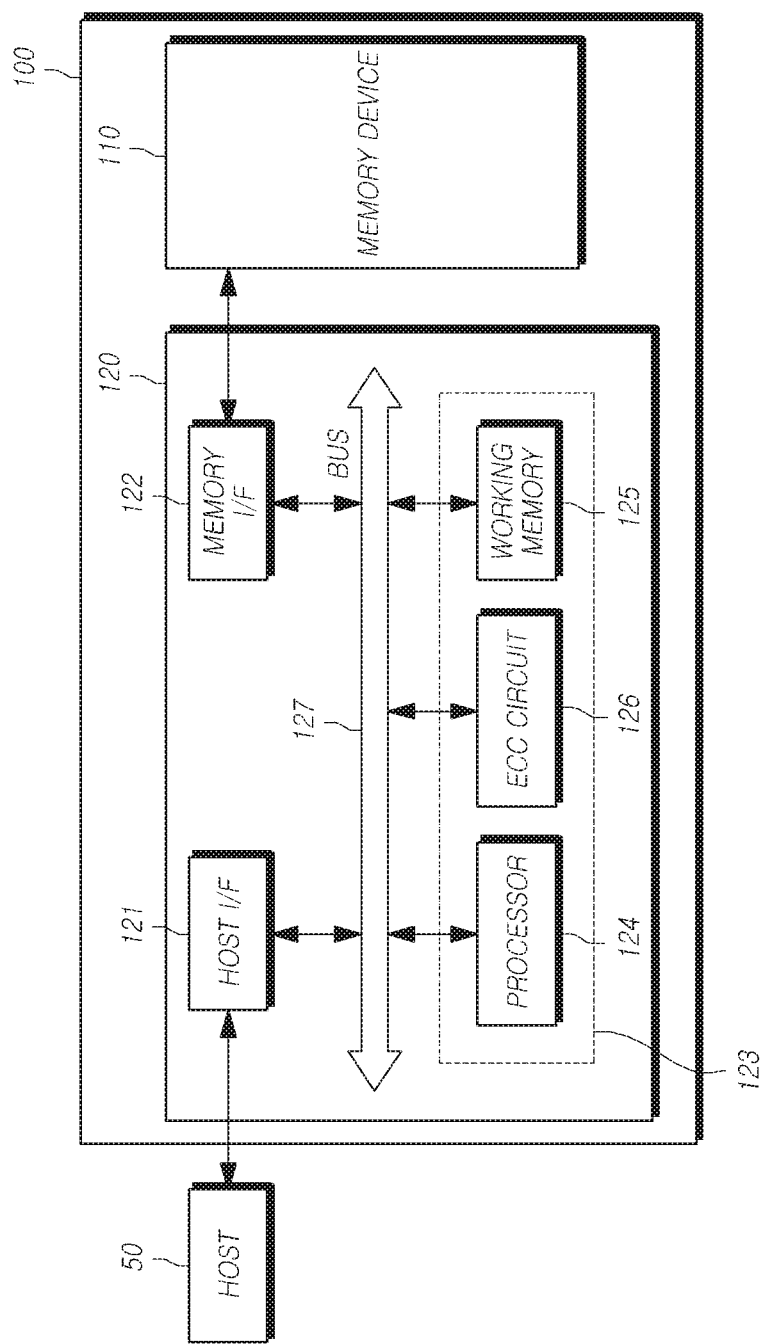

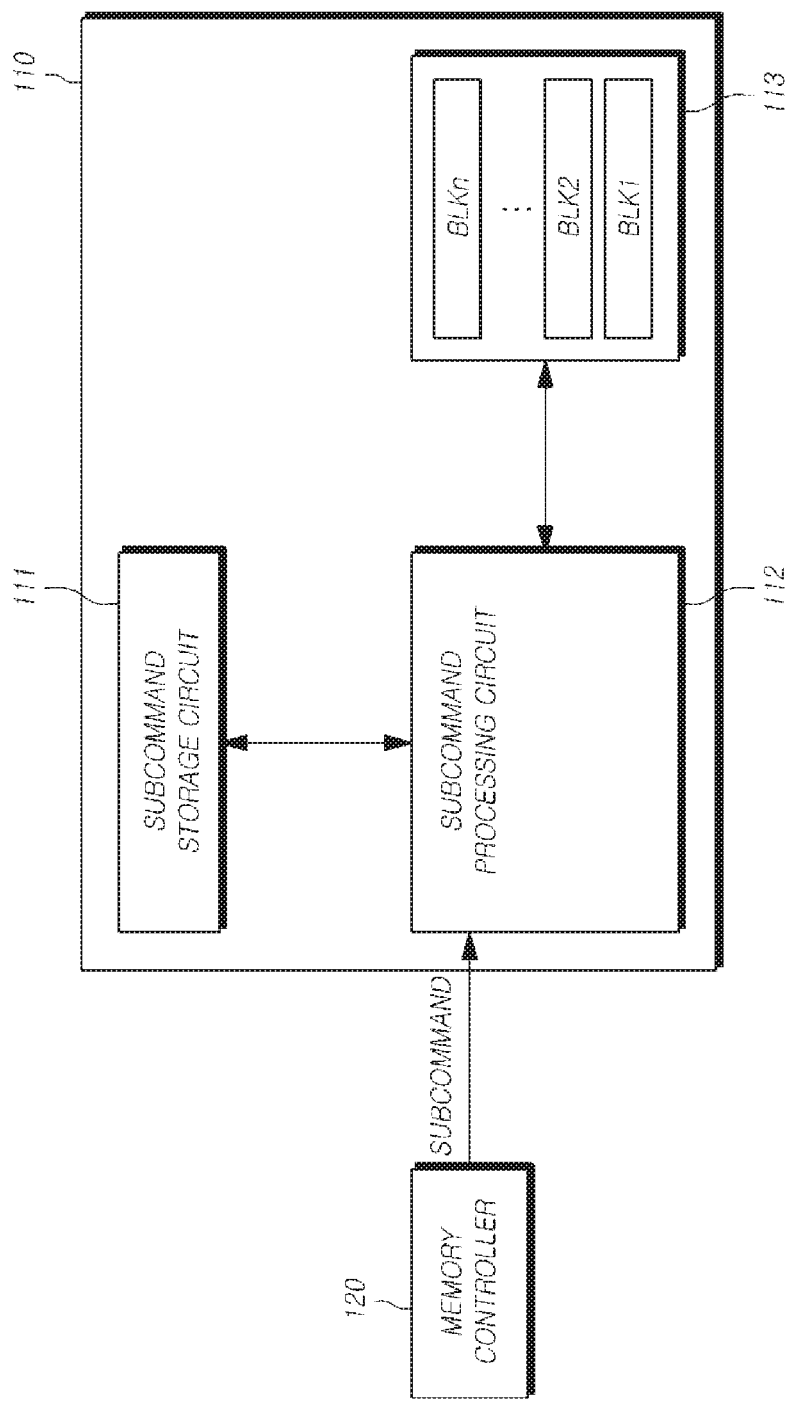

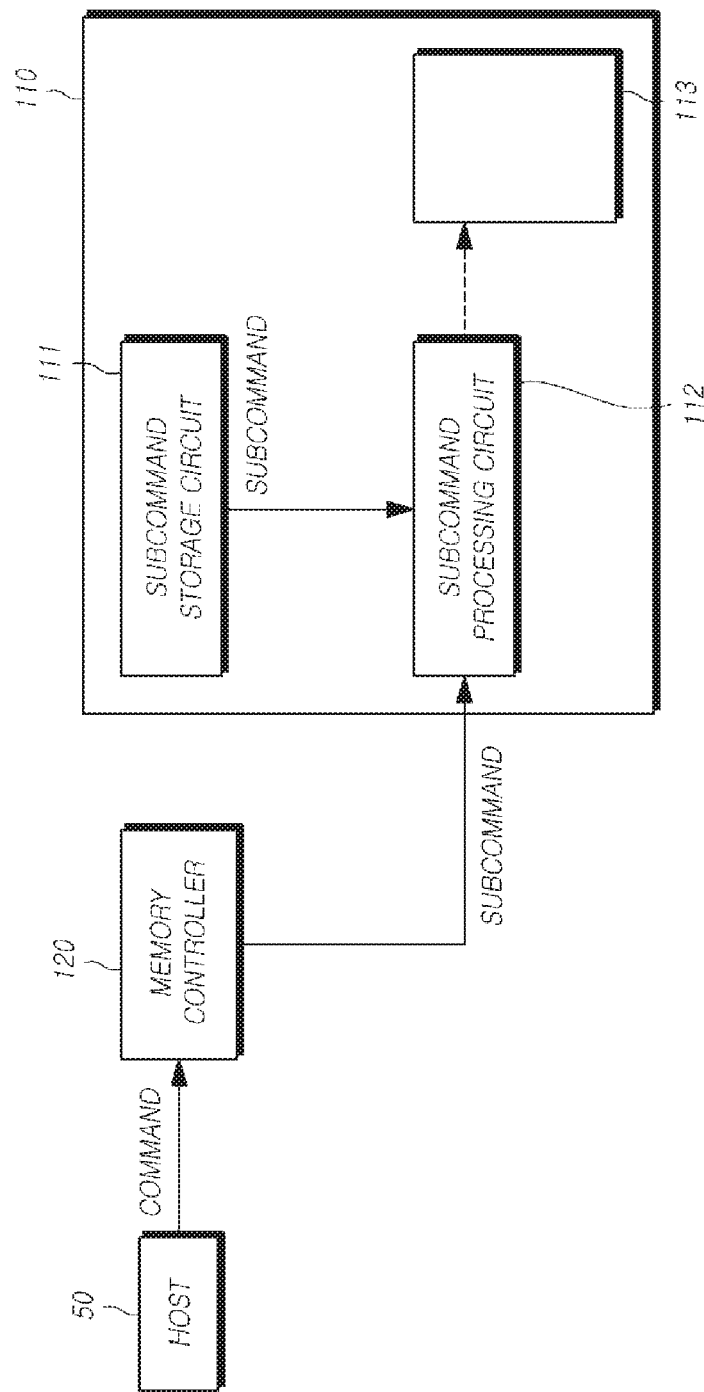

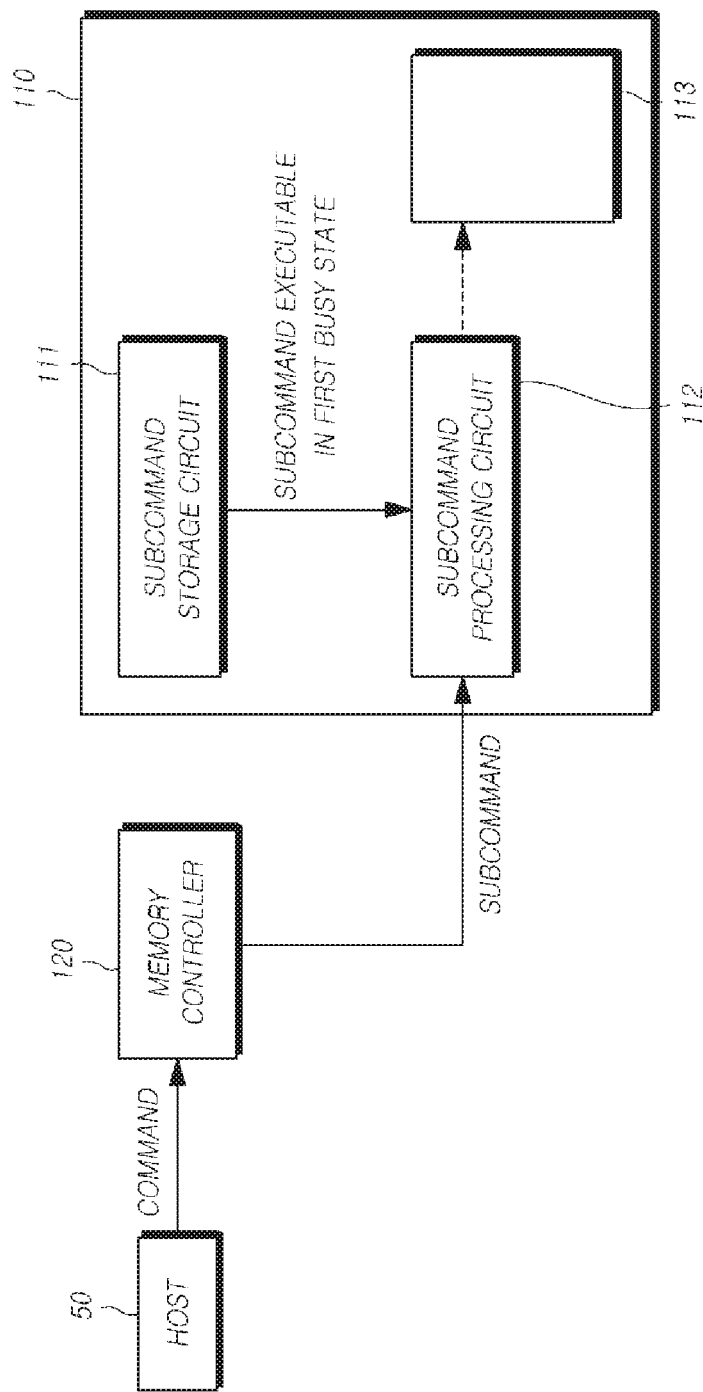

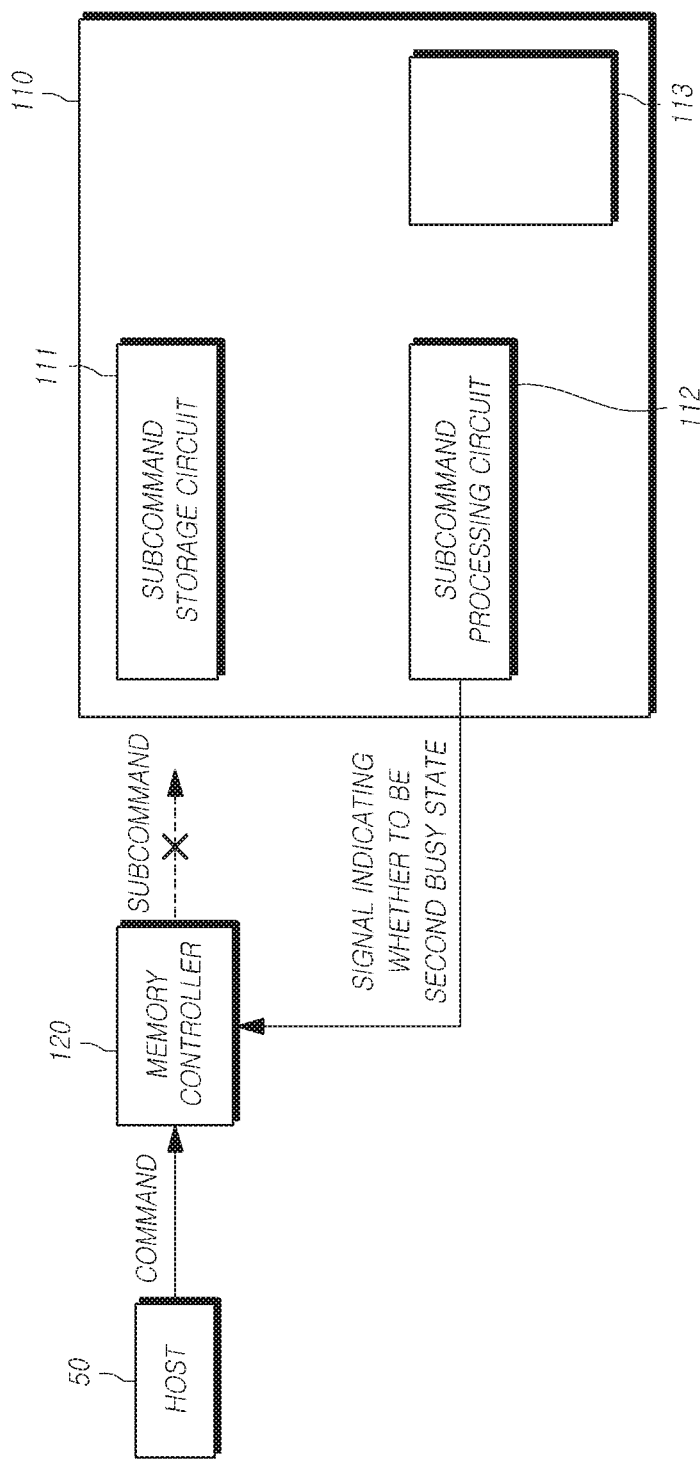

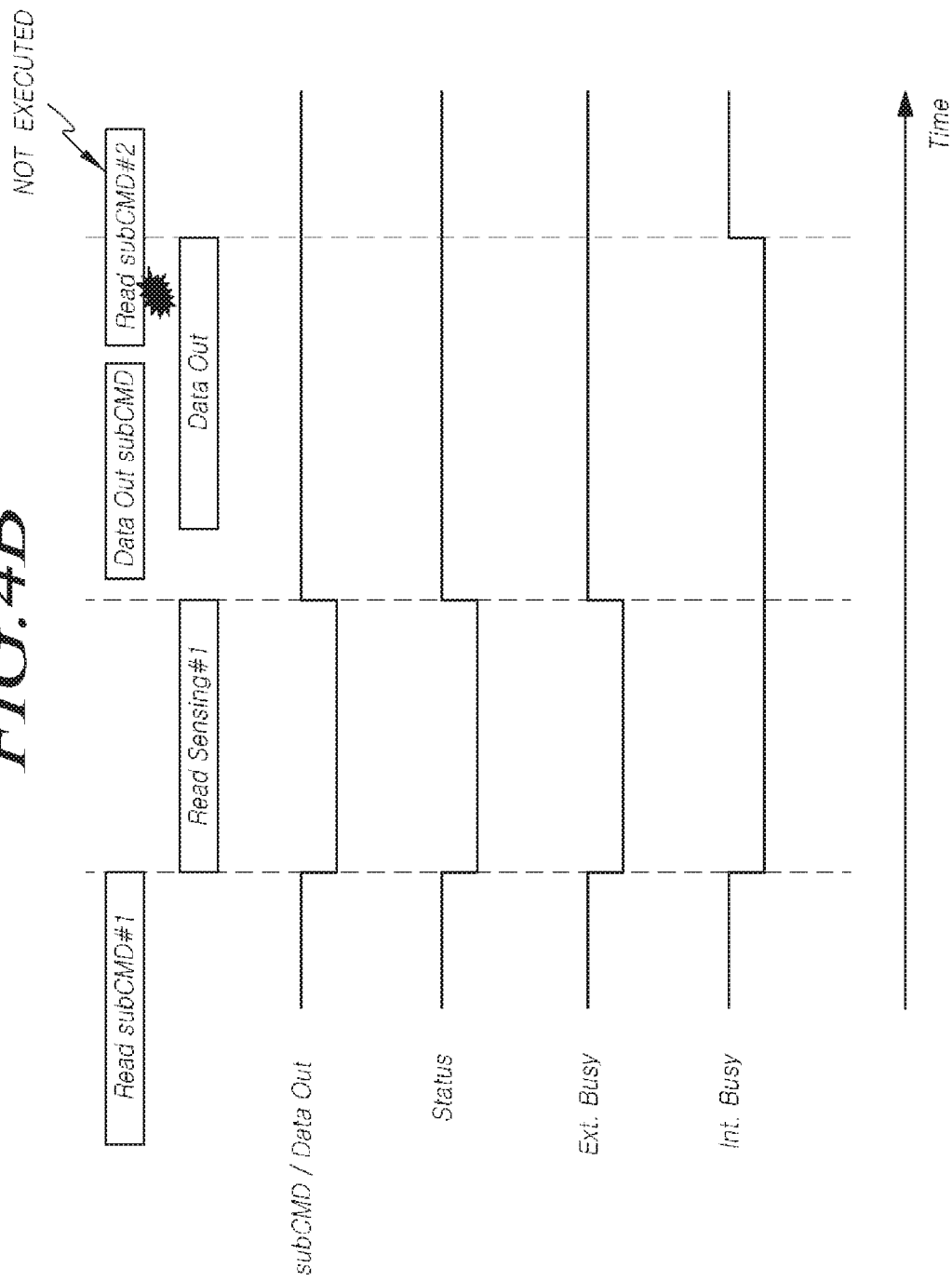

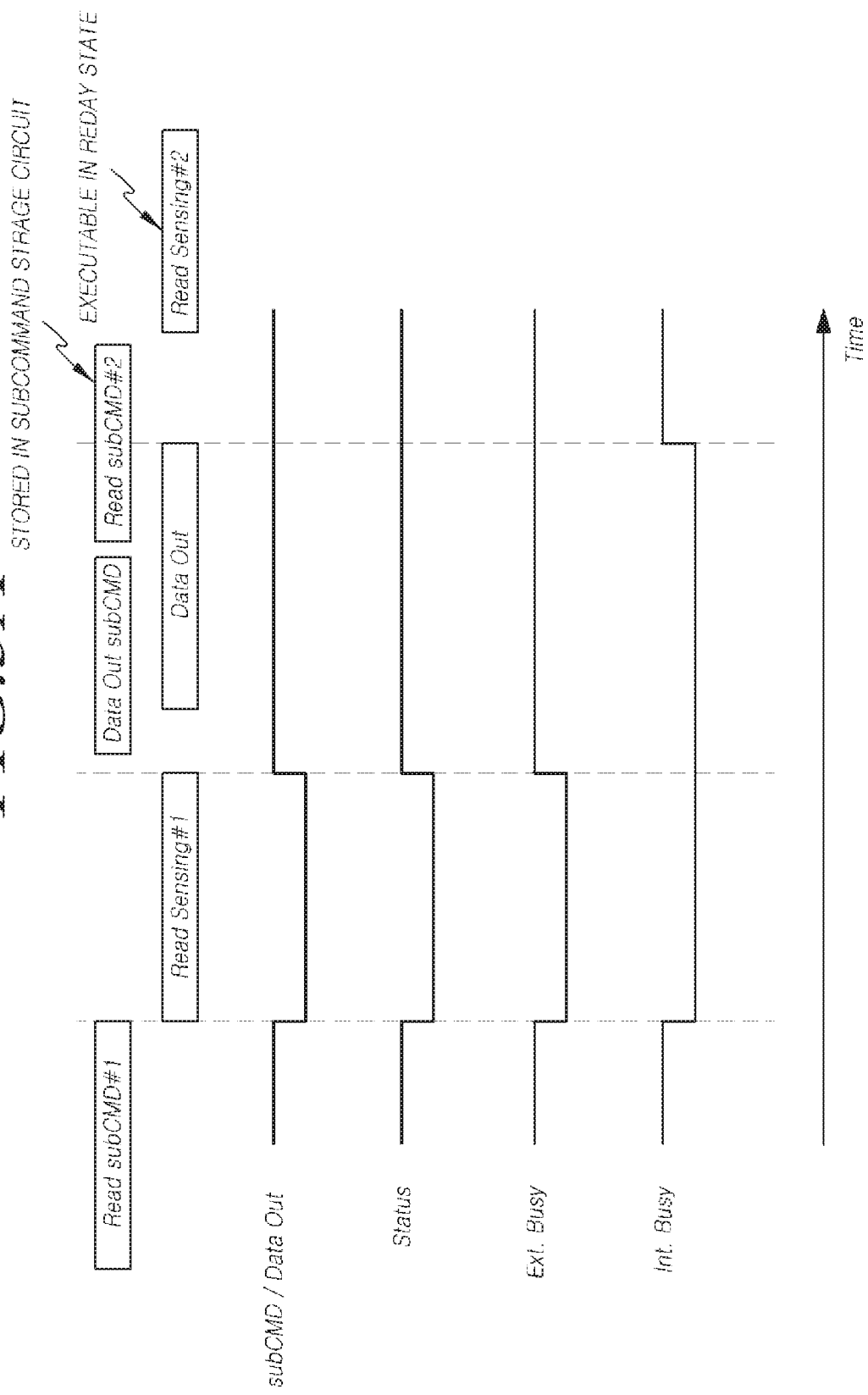

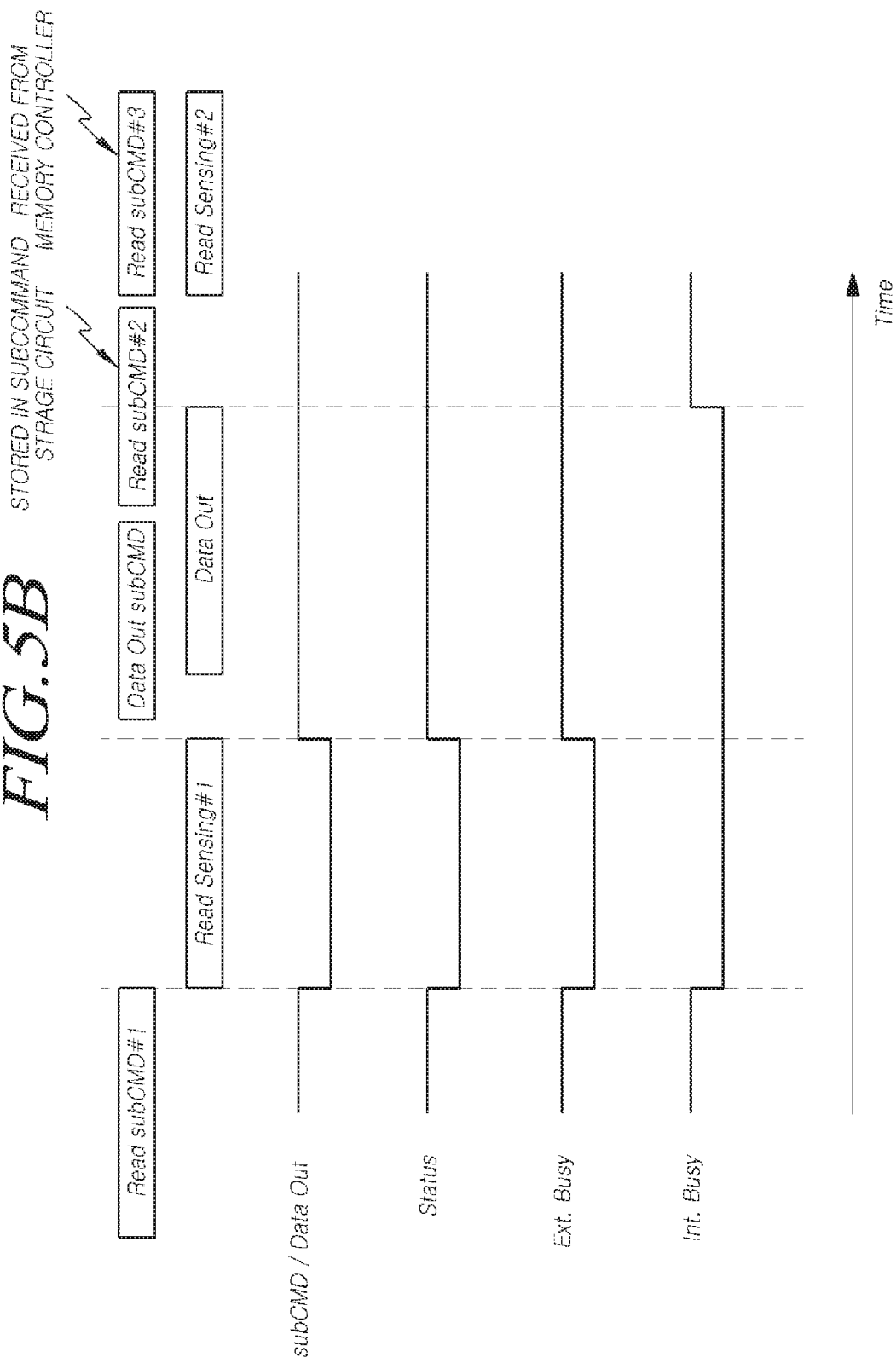

MEMORY SYSTEM, MEMORY DEVICE AND OPERATING METHOD THEREOF

CROSS-REFERENCE TO RELATED APPLICATION

The present application claims priority under 35 U.S.C. 119(a) to Korean patent application number 10-2019-0029116, filed on Mar. 14, 2019, which is incorporated herein by reference in its entirety.

BACKGROUND

1. Technical Field

Various embodiments of the present invention relate to a memory system, a memory device, and an operating method thereof.

2. Related Art

A memory system including a storage device stores data based on a request of a host such as a computer, a smart phone and various electronics devices. The memory system includes not only a device which stores data in a magnetic disk, such as a hard disk drive (HDD), but also a device which stores data in a nonvolatile memory, such as a solid state drive (SDD), a universal flash storage (UFS) device and an embedded MMC (eMMC) device.

The memory system may include a memory controller to control a memory device. The memory controller may receive a command from a host and generate a subcommand to perform read, write, or erase operations according to the received command of the host. The memory controller may transmit the generated subcommand to the memory device.

The subcommand sent by the memory controller may not be normally executed in the memory device when the operation timing of the memory device changes due to a drop in the voltage supplied to the memory device or the like.

SUMMARY

Embodiments of the present invention provide a memory system, a memory device, and an operating method thereof which may minimize the possibility of malfunction that may occur due to a change in the operation timing of the memory device.

Embodiments of the present invention provide a memory system, a memory device, and an operating method thereof which may minimize additional logic circuitry for storing the subcommand received from the memory controller.

In an embodiment, the memory system may comprise a memory device comprising a plurality of memory blocks and a subcommand storage circuit, and a memory controller for controlling the memory device and providing a plurality of subcommands to the memory device.

The memory device may have one of a ready state in which the plurality of subcommands are executable, a first busy state in which at least one of the plurality of subcommands is executable, and a second busy state in which the plurality of subcommands are not executable.

When a subcommand is received from the memory controller in the first busy state, the memory device may store the subcommand in the subcommand storage circuit when the subcommand is executable after the first busy state is released.

The memory device may execute the subcommand stored in the subcommand storage circuit after the memory device is changed to the ready state.

In an embodiment, a memory device may comprise a plurality of memory blocks, a subcommand storage circuit for storing one or more subcommands and a subcommand processing circuit for processing the subcommands.

The memory device may have one of a ready state in which the subcommands are executable, a first busy state in which at least one of the subcommands is executable, and a second busy state in which the subcommands are not executable.

When the subcommand processing circuit receives a subcommand from a memory controller in the first busy state, the subcommand processing circuit stores the subcommand in the subcommand storage circuit when the subcommand is executable after the first busy state is released.

The subcommand stored in the subcommand storage circuit may be executed after the memory device is changed to the ready state.

In an embodiment, an operating method of a memory device may comprise: determining whether a subcommand among a plurality of subcommands received from a memory controller is executable in a first busy state in which at least one of the plurality of subcommands are executable.

The operating method of a memory device may comprise: storing the subcommand when it is determined that the subcommand is executable after the first busy state is released.

The operating method of a memory device may comprise: executing the stored subcommand after the memory device is changed to a ready state in which the plurality of subcommands are executable.

In an embodiment, the memory system may comprise a controller suitable for providing a plurality of subcommands and a memory device having one of a ready state, a first busy state and a second busy state.

The memory device is suitable for: in the first busy state, receiving a subcommand, determining whether the received subcommand is executable, executing the received subcommand when it is determined that the received subcommand is executable and storing the received subcommand to be executed after being changed into the ready state when it is determined that the received subcommand is not executable.

The memory device may transmit a signal indicating the second busy state to the controller.

The memory system, the memory device, and the operating method thereof in accordance with the embodiments of the present invention may minimize the possibility of malfunction that may occur due to a change in the operation timing of the memory device.

The memory system, the memory device, and the operating method thereof in accordance with the embodiments of the present invention may minimize additional logic circuitry for storing the subcommand transmitted from the memory controller.

BRIEF DESCRIPTION OF THE DRAWINGS

FIG. 1 is a diagram illustrating a memory system in accordance with an embodiment of the present invention.

FIG. 2 is a diagram illustrating the memory device of FIG. 1.

FIG. 3A is a diagram illustrating an operation of a memory controller and a memory device in accordance with an embodiment of the present invention.

FIG. 3B is a diagram illustrating an operation of a memory controller and a memory device in accordance with an embodiment of the present invention.

FIG. 3C is a diagram illustrating an operation of a memory controller and a memory device in accordance with an embodiment of the present invention.

FIG. 4B is a timing diagram illustrating an operation in which a memory device reads data according to a comparative example.

FIG. 5A is a timing diagram illustrating an operation in which a memory device reads data in accordance with an embodiment of the present invention.

FIG. 5B is a timing diagram illustrating an operation in which a memory device reads data in accordance with an embodiment of the present invention.

DETAILED DESCRIPTION

Figure 4A:
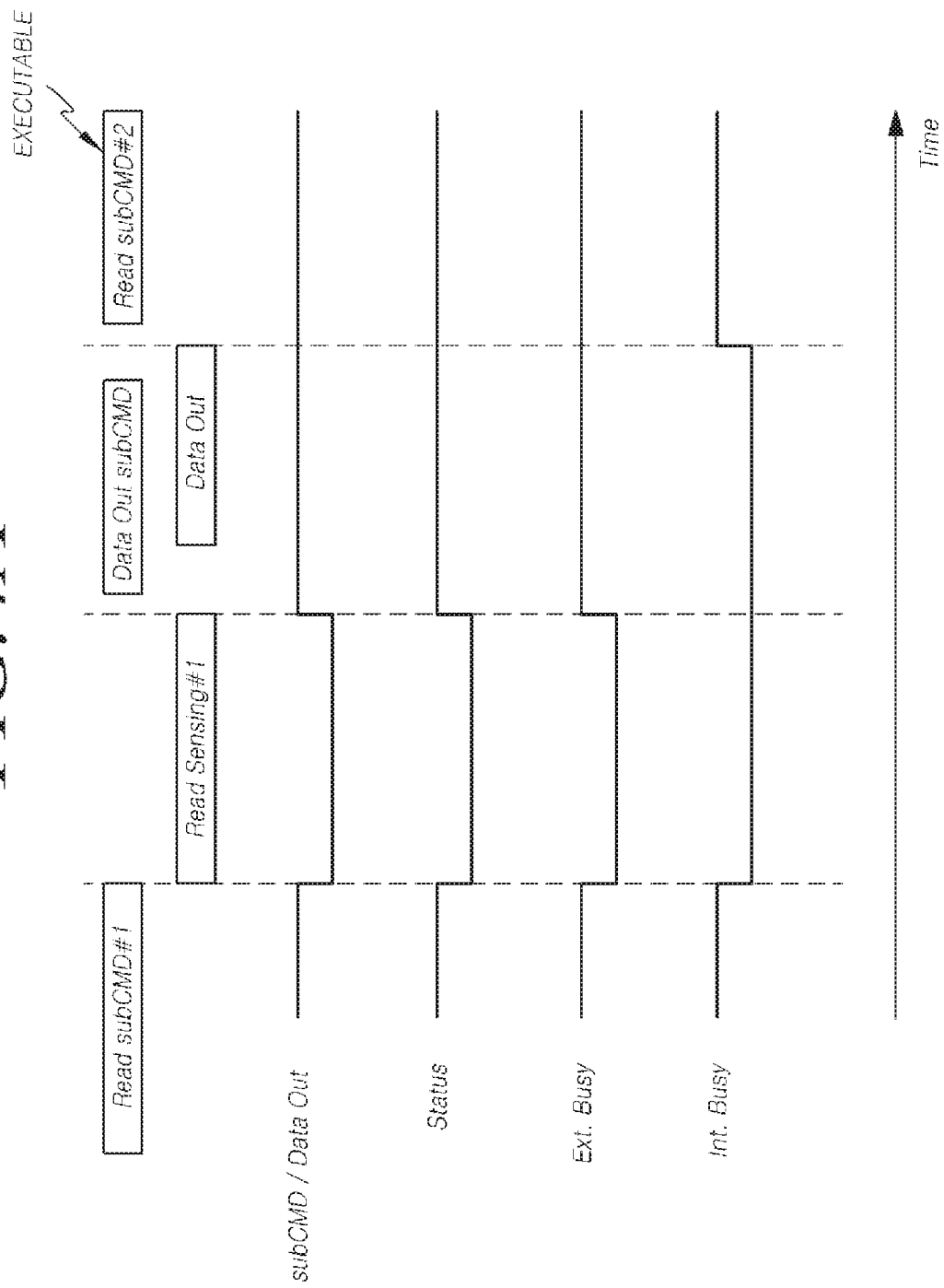
FIG. 4A is a timing diagram illustrating an operation in which a memory device reads data according to a comparative example.

In the disclosure, advantages, features and methods for achieving the advantages and features will become more apparent after a reading of the following exemplary embodiments taken in conjunction with the accompanying drawings. The disclosure may, however, be embodied in different forms and should not be construed as being limited to the embodiments set forth herein. Rather, these embodiments are provided to describe the disclosure in detail to the extent that a person skilled in the art to which the disclosure pertains may easily carry out the technical idea of the disclosure.

As used herein, the term "and/or" includes any and all combinations of one or more of the associated listed items. The terms such as "first" and "second" may be used to describe various components, but those components should not be limited by the terms. The terms are merely used to distinguish one component from other components. For example, a first component may be designated as a second component and a second component may be designated as a first component in a similar manner, without departing from the scope based on the concept of the disclosure.

It will be understood that, when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other representations describing relationships among components, such as, "between" and "directly between" or "adjacent to," and "directly adjacent to," should be interpreted in similar manners.

A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude a possibility that one or more other features, numbers, steps, operations, components, parts, or combinations thereof will be present or added.

Unless differently defined, all terms used herein, including technical or scientific terms, have the same meanings as the terms generally understood by those skilled in the art to which the disclosure pertains. The terms identical to those defined in generally used dictionaries should be interpreted as having meanings identical to contextual meanings of the related art, and are not interpreted as being ideal or excessively formal meanings unless they are definitely defined in the present specification.

Also, in describing the components of the disclosure, there may be terms used like first, second, A, B, (a), and (b). These are solely for the purpose of differentiating one component from the other but do not imply or suggest the substances, time sequence, or time sequence of the components. If a component is described as "connected," "coupled" or "linked" to another component, it may mean that the component is not only directly "connected," "coupled" or "linked" but also is indirectly "connected," "coupled" or "linked" via a third component.

Hereafter, the embodiments of the present invention will be described in detail to reference with the drawings.

FIG. 1 is a diagram illustrating a memory system 100 in accordance with an embodiment of the present invention.

Referring to FIG. 1, the memory system 100 may include a memory device 110 to store data and a controller 120 to control the memory device 110.

The memory device 110 may include a plurality of memory blocks 113. The memory device 110 may operate in response to the control of the controller 120. As an example, an operation of the memory device 110 may include a read operation, a program operation (or a write operation), and an erase operation.

The memory device 110 may include a memory cell array including a plurality of memory cells which store data. Each of the memory blocks 113 may include memory cells.

In an embodiment, the memory device 110 may be a double data rate (DDR) synchronous dynamic random access memory (SDRAM), a low power double data rate 4 (LPDDR4) SDRAM, a graphics double data rate (DDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change memory (PRAM), a magnetoresistive random access memory (MRAM), a ferroelectric random access memory (FRAM) or a spin transfer torque random access memory (STT-RAM).

In an embodiment, the memory device 110 may be realized as a three-dimensional array structure. The disclosure may be applied to not only a flash memory device in which a charge storage layer is configured by a conductive floating gate (FG) but also a charge trap flash (CTF) in which a charge storage layer is configured by a dielectric layer.

The memory device 110 is configured to receive a command and an address from the controller 120 and access a region selected by the address in the memory cell array. That is, the memory device 110 may perform an operation corresponding to the command, for the region selected by the address. A subcommand may be generated based on the command, received from a host 50 by the memory controller 120. One or more subcommands may correspond to one command.

The memory device 110 may perform a read operation, a program operation, and/or an erase operation. In the program operation, the memory device 110 may program data to the region selected by the address. In the read operation, the memory device 110 may read data from the region selected by the address. In the erase operation, the memory device 110 may erase data stored in the memory block 113 or data for the region selected by the address.

The memory controller 120 may control an operation of the memory device 110 either at the request of the host 50 or irrespective of the request of the host 50. The request of the host 50 may be included in the above mentioned command.

Further, the memory controller 120 may control a background operation on the memory device 110. As an example, the background operation may include a garbage collection, a wear leveling, and a bad block management operation.

The controller 120 may include a host interface (I/F) 121, a memory interface (I/F) 122, and a control circuit 123.

The host interface 121 provides an interface for communication with the host 50. The control circuit 123 may execute the operation of receiving the command from the host 50 via the host interface 121 and processing the received command.

The memory interface 122 is coupled to the memory device 110 and provides an interface for communication with the memory device 110. The memory interface 122 is configured to provide the interface between the memory device 110 and the memory controller 120 in response to the control circuit 123.

The control circuit 123 may perform general operations of the memory controller 120, and may control the operation of the memory device 110. The control circuit 123 may include a processor 124, a working memory 125, and an error correction code (ECC) circuit 126.

The processor 124 may control general operations of the controller 120, and may perform a logic operation. The processor 124 may communicate with the host 50 through the host interface 121, and may communicate with the memory device 110 through the memory interface 122.

The processor 124 may perform the function of a flash translation layer (FTL). The processor 124 may translate a logical block address (LBA) into a physical block address (PBA), through the flash translation layer. The flash translation layer may receive the logical block address from the host 50 and translate the logical block address into the physical block address of the memory device 110, by using a mapping table. There are various address mapping methods of the flash translation layer, depending on a mapping unit. For example, address mapping methods include a page mapping method, a block mapping method, and a hybrid mapping method.

The processor 124 is configured to randomize data received from the host 50, in the program operation. For example, the processor 124 may randomize the data received from the host 50, by using a randomizing seed. Randomized data as data to be stored is provided to the memory device 110 and is programmed in the memory cell array of the memory device 110.

The processor 124 is configured to derandomize data received from the memory device 110, in the read operation. For example, the processor 124 may derandomize data received from the memory device 110, by using a derandomizing seed. Derandomized data may be outputted to the host 50.

The processor 124 may execute firmware to control the operation of the memory controller 120. The processor 124 may control general operations of the memory controller 120, and drive the firmware loaded in the working memory 125 to perform a logic operation. For example, the firmware may be stored in the memory device 110 and loaded to the working memory 125 upon booting.

The firmware is a program executed in the memory system 100. The firmware may include one or more of the flash translation layer (FTL), a host interface layer (HIL), and a flash interface layer (FIL).

The flash translation layer may perform a function of translating between a logical address requested by the host 50 and a physical address of the memory device 110. The host interface layer may play a role of interpreting a received command from the host 50 and transferring the command to the flash translation layer. The flash interface layer may convey the command instructed by the flash translation layer to the memory device 110.

The working memory 125 may store the firmware, a program code, a command, or data which is necessary to drive the memory controller 120.

The working memory 125 may include one or more of a static RAM (SRAM), a dynamic RAM (DRAM), and a synchronous DRAM (SDRAM).

The ECC circuit 126 may be configured to detect an error of data stored in the working memory 125 using an error correction code (ECC) and may correct the error of data. The stored data in the working memory 125 may be the read data received from the memory device 110.

The ECC circuit 126 may be configured to decode the data using an error correction code. The ECC circuit 126 may be implemented with various decoders. For example, a decoder may include a decoder that performs unstructured (or non-systematic) code decoding or a decoder that performs structured (or systematic) code decoding.

For example, the ECC circuit 126 may detect error bits in units of sectors for each of the read data. That is, each read data may be composed of a plurality of sectors. A sector may mean a unit of data that is less than a page that is the read unit of the memory device 110. The sectors constituting each read data may correspond to each other via an address.

The ECC circuit 126 may calculate a bit error rate (BER) and determine whether or not the error may be corrected in units of sectors. When the bit error rate is greater than or equal to a reference value, the ECC circuit 126 may determine the corresponding sector as uncorrectable or a fail. When the bit error rate is less than the reference value, the ECC circuit 126 may determine the corresponding sector as correctable.

The ECC circuit 126 may sequentially perform an error detection and correction operation on all of the read data. When the sector included in the read data is correctable, the ECC circuit 126 may omit the error detection and correction operation for the sector corresponding to the next read data. When the error detection and correction operation for all of the read data is finished, the ECC circuit 126 may detect the sector determined to be uncorrectable. There may be one or more sectors that are determined to be uncorrectable. The ECC circuit 126 may transmit information (e.g., address information) about the sector determined to be uncorrectable to the processor 124.

The bus 127 may be configured to provide channels among the components 121, 122, 124, 125 and 126 of the memory controller 120. For example, the bus 127 may include a control bus for transmitting various control signals and commands, and a data bus for transmitting various data.

The above-mentioned components 121, 122, 124, 125 and 126 of the memory controller 120 are merely illustrative. Some of the components 121, 122, 124, 125 and 126 may be deleted, or some of the above-mentioned components 121, 122, 124, 125 and 126 may be integrated into one, or one or more components may be added.

Hereinafter, the memory device will be described in detail in reference to FIG. 2.

FIG. 2 is a diagram illustrating the memory device 110 of FIG. 1.

Referring to FIG. 2, the memory device 110 may include a subcommand storage circuit 111, a subcommand processing circuit 112, and a plurality of memory blocks 113.

The subcommand storage circuit 111 may store one or more subcommands received from the memory controller 120.

For example, the subcommand store circuit 111 may include one or more registers for storing the subcommand. One of the registers in the subcommand storage circuit 111 may be a register located in a register table in the memory device 110. Since the register table is a module generally included in the memory device 110, the subcommand storage circuit 111 does not need to further configure an additional logic circuit to store the subcommand.

Further, the subcommand storage circuit 111 may include an internal memory such as a nonvolatile memory (NVM) for storing the subcommand.

The subcommand processing circuit 112 may execute an operation of processing the subcommand received from the memory controller 120.

The subcommand processing circuit 112 may include a control logic which is configured to control general operations of the memory device 100 and process the subcommand operation. The subcommand processing circuit 112 may be implemented by an FPGA, or an ASIC.

The subcommand processing circuit 112 may operate differently depending on a state of the memory device 110. In embodiments of the present invention, the memory device 110 may have one or more of a ready state, a first busy state, and a second busy state.

The first busy state means a state in which some of the subcommands which the memory device 110 receives from the memory controller 120 are executable even when the memory device 110 is in a busy state. The first busy state may be referred to as an internal busy state.

Examples of a subcommand executable in the first busy state may be a subcommand for instructing a reset operation or a subcommand for instructing a data output operation, among the subcommands received from the memory controller 120. For example, the subcommand for the reset operation or the subcommand for the data output operation may be executed even when the memory device 110 is in the first busy state.

Whether the memory device 110 is in the first busy state may be confirmed only within the memory device 110, and may not be confirmed outside the memory device 110. The memory controller 120 may not confirm whether the state of the memory device 110 is the first busy state. Thus, when the memory controller 120 transmits a subcommand to the memory device 110, there is a possibility that the subcommand sent to the memory device 110 is not executed if the memory device 110 is in the first busy state.

The second busy state means a state in which all subcommands received from the memory controller 120 by the memory device 110 are not executable when the memory device 110 is in the busy state. The second busy state may be referred to as an external busy state.

Whether or not the memory device 110 is in the second busy state may be confirmed outside of the memory device 110 as well. The memory controller 120 may check whether the state of the memory device 110 is the second busy state. If the state of the memory device 110 is the second busy state, the memory controller 120 may control not to transmit the subcommand to the memory device 110.

The ready state means a state in which the memory device 110 receives a subcommand from the memory controller 120 and may execute the received subcommand. If the memory device 110 is not in the first busy state and is not in the second busy state, the memory device 110 may be in the ready state.

The plurality of memory blocks BLK 1 to BLKn 113 may store data. Each of the memory blocks 113 may include a plurality of word lines, and each word line may be coupled to a plurality of memory cells.

Each memory cell may store at least one bit of data. For example, each memory cell may be a single-level cell (SLC) storing one bit of data. For example, each memory cell may be a multi-level cell (MLC) storing two bits of data. For example, each memory cell may be a triple-level cell (TLC) storing three bits of data. For example, each memory cell may be a quad-level cell (QLC) that stores 4 bits of data. For example, each memory cell may store more than five bits of data.

The subcommand processing circuit 112 may access at least a part of the plurality of memory blocks 113 to process the subcommand received from the memory controller 120.

For example, in order to process a subcommand for executing the read operation, the subcommand processing circuit 112 may read data stored in at least a part of the plurality of memory blocks 113 and load the data into a page buffer therein. For another example, in order to process a subcommand for executing the program operation, the subcommand processing circuit 112 may program data to at least a part of the plurality of memory blocks 113.

Hereinafter, the operation of the memory device 110 in each state will be described in detail with reference to FIGS. 3A to 3C.

Referring again to FIG. 2, the memory controller 120 may output the subcommand to transmit to the memory device 110. The memory device 110 receives the subcommand from the memory controller 120 as the input.

When the memory controller 120 receives a command from the host 50, the memory controller 120 may store the command in one or more command queues (not shown) therein. The memory controller 120 may adjust a priority in which the command is to be executed using the one or more command queues.

The memory controller 120 may determine the command to be executed according to the adjusted priority. The memory controller 120 may then generate a subcommand based on the command currently being executed and send the generated subcommand to the memory device 110.

In an embodiment, one subcommand may be generated based on one command. If one subcommand is generated based on one command, the operation indicated by the corresponding command and the operation indicated by the corresponding subcommand may be the same.

In an embodiment, a plurality of subcommands may be generated based on one command. If a plurality of subcommands are generated based on one command, each subcommand may indicate a part of the operation indicated by the command.

In an embodiment, a plurality of subcommands may be generated based on a plurality of commands. Each of the subcommands may indicate a portion of the overall operation indicated by one or more commands.

Alternatively, the memory controller 120 may generate a subcommand irrespective of the command received from the host 50.

FIG. 3A is a diagram illustrating an operation of a memory controller and a memory device when the memory device is in a ready state, in accordance with the embodiments of the present invention. For example, the operation of FIG. 3A may be performed by the memory controller 120 and the memory device 110 of FIGS. 1 and 2.

Referring to FIG. 3A, the memory controller 120 generates the subcommand based on the command received from the host 50. Alternatively, the memory controller 120 generates the subcommand irrespective of the command. Further, the memory controller 120 transmits the generated subcommand to the memory device 110.

The subcommand processing circuit 112 may process the subcommand received from the memory controller 120.

The subcommand processing circuit 112 executes the subcommand (referred to as first subcommand) stored in the subcommand storage circuit 111 as well as the subcommand (referred to as second subcommand) received from the memory controller 120.

The first subcommand may be one or more subcommands. The first subcommand may be a subcommand received from the memory controller 120 when the memory device 110 was in the first busy state before the memory device 110 becomes in the ready state.

When the subcommand processing circuit 112 processes the subcommands, which are received from the memory controller 120 or read from the subcommand storage circuit 111, the subcommand processing circuit 112 may process the subcommands in the time sequence or the order in which they are generated or the memory device 110 is received from the memory controller 120.

The subcommand processing circuit 112 may preferentially execute the first subcommand stored in the subcommand storage circuit 111 when the first subcommand and the second subcommand received from the memory controller 120 may be executed simultaneously. The first subcommand is the subcommand received from the memory controller 120 when the memory device 110 was in the first busy state before the memory device 110 became in the ready state.

When a plurality of subcommands are stored in the subcommand storage circuit 111, the subcommand processing circuit 112 processes the plurality of subcommands in accordance with the time sequence stored in the subcommand storage circuit 111.

FIG. 3B is a diagram illustrating an operation of a memory controller and a memory device when the memory device is in a first busy state, in accordance with an embodiment of the present invention. For example, the operation of FIG. 3B may be performed by the memory controller 120 and the memory device 110 of FIGS. 1 and 2.

Referring to FIG. 3B, the memory controller 120 generates the subcommand based on the command received from the host 50. Alternatively, the memory controller 120 generates the subcommand irrespective of the command. Further, the memory controller 120 transmits the generated subcommand to the memory device 110.

The subcommand processing circuit 112 may determine whether or not the subcommand received from the memory controller 120 is executable in the first busy state. As mentioned above in reference with FIG. 2, the memory device 110 may execute only a specific subcommand among all the subcommands in the first busy state. For example, the specific subcommand may include the subcommand for instructing the reset operation or the subcommand for instructing the data output operation.

When the received subcommand may be executable in the first busy state, the subcommand processing circuit 112 may execute the received subcommand.

When the received subcommand may not be executable in the first busy state and may be executable after the first busy state is released, the subcommand processing circuit 112 supplies the received subcommand to the command storage circuit 111 and the command storage circuit 111 stores the received subcommand. The subcommand stored in the subcommand storage circuit 111 may be executed after the memory device 110 is released from the first busy state and then changed to the ready state.

The memory controller 120 transmits the subcommand to the memory device 110 in a state where the memory controller 120 may not know whether the memory device 110 is in the first busy state. Thus, the subcommand storage circuit 111 stores the subcommand that may not be executable in the first busy state and may be executable after the first busy state is released.

The memory controller 120 may determine that the memory device 110 may execute a subcommand and transmit the subcommand to the memory device 110. However, the memory device 110 may not execute the subcommand due to the first busy state. Therefore, the memory device 110 cannot execute the subcommand to be executed.

When the operation timing of the memory device 110 is changed due to a voltage drop to the memory device 110, the time for which the memory device 110 is maintained in the first busy state may increase so that the memory device 110 cannot execute the received subcommand.

Thus, the memory device 110 temporarily stores the received subcommand in the first busy state in the subcommand storage circuit 111 so that it may be executed later. Then, when the memory device 110 is changed to the ready state, the subcommand may be executed.

FIG. 3C is a diagram illustrating an operation of a memory controller and a memory device when the memory device is in a second busy state, in accordance with an embodiment of the present invention. For example, the operation of FIG. 3C may be performed by the memory controller 120 and the memory device 110 of FIGS. 1 and 2.

Referring to FIG. 3C, the memory device 110 becomes in the second state when the operation timing of the memory device 110 is changed due to a voltage drop to the memory device 110.

As described above, unlike the first busy state, the memory controller 120 outside of the memory device 110, may confirm whether the memory device 110 is in the second busy state.

As an example of a method for enabling the memory controller 120 to check whether the memory device 110 is in the second busy state, the memory device 110 may output, to the memory controller 120, a signal or information indicating whether the memory device 110 is in the second busy state. The memory device 110 may include a terminal (e.g., ready/busy pin) for outputting the signal or the information.

When the memory device 110 is in the second busy state, the memory device 110 may not execute all of the subcommands received by the memory controller 120. The memory controller 120 knows whether the memory device 110 is in the second busy state based on the signal or the information from the memory device 110. Thus, the memory controller 120 may stop transmitting the subcommand to memory device 110.

Hereinafter, the operation of the memory device 110 to process the received subcommand from the memory controller 120 will be described as an example of the read operation with reference to FIGS. 1 to 3C.

When the memory device 110 reads data, a read sensing operation and a data output operation may be separately performed to improve the read operation performance. The method of separately performing the read sensing operation and the data output operation may be referred to as a faster read method.

The read sensing operation includes loading (or sensing) the data stored in a part of the plurality of memory blocks in the memory device 110 to a page buffer (not shown) in the memory device 110. The page buffer may be implemented with a random access memory (RAM), for example, an SRAM, a DRAM, or an SDRAM.

The data output operation includes outputting the loaded data in the page buffer through an input and output terminal for transmitting to the memory controller 120.

The memory controller 120 may separately generate a subcommand for instructing the read sensing operation and a subcommand for instructing the data output operation. That is, the subcommand for the read sensing operation and the subcommand for the data output operation may be transmitted to the memory device 110 at different timings.

In an embodiment, the subcommand for the read sensing operation and the sub command for the data output operation may correspond to one read command, which is transmitted from the host 50 to the memory controller 120.

Alternatively, the host 50 may separately transmit a command for instructing the read sensing operation and a command for instructing the data output operation to the memory controller 120. In this case, the subcommand for instructing the read sensing operation may correspond to the command for instructing the read sensing operation. The subcommand for instructing the data output operation may correspond to the command for instructing the data output operation.

In the ready state, the memory device 110 may perform the read sensing operation. When the read sensing operation is started, the state of the memory device 110 is changed from the ready state to the second busy state. After the read sensing operation is completed, the state of the memory device 110 is changed from the second busy state to the first busy state.

In the first busy state, the memory device 110 may perform the data output operation. When the data output operation is started, the state of the memory device 110 is maintained in the first busy state. After the data output operation is completed, the state of the memory device 110 is changed from the first busy state to the ready state.

Hereafter, operations in which the memory device reads the data in accordance with the comparative example and embodiments of the present invention will be described in detail in reference with FIGS. 4A to 5B.

FIGS. 4A to 5B, the subcommand/data output value "subCMD/Data Out" indicates whether the memory device 110 receives the subcommand from the memory controller 120 or executes the data output. If the value "subCMD/Data Out" has a logic high value "High", the memory device 110 receives the subcommand from the memory controller 120 or executes the data output. If the value "subCMD/Data Out" has a logic low value "Low", the memory device 110 doesn't perform the operations described above.

The status value "Status" is a value indicating the state of the memory device 110.

The external busy value "Ext. Busy" and the internal busy value "Ext. Busy" are values used to indicate the state of the memory device 110.

In one example, if the external busy value "Ext. Busy" has a logic low value "Low", the memory device 110 may be in a second busy state. If the external busy value "Ext. Busy" has a logic high value "High" and the internal busy value "Int. Busy" has a logic low value "Low", the memory device 110 may be in the first busy state. If the external busy value "Ext. Busy" has a logic high "High" and the internal busy value "Int. Busy" has a logic high "High", the memory device 110 may be ready.

FIG. 4A is a timing diagram illustrating an operation in which a memory device reads data according to a comparative example. For example, the operation of FIG. 4A may be performed by the memory controller 120 and the memory device 110 of FIG. 1.

Referring to FIG. 4A, when the memory device 110 receives the first read sensing subcommand (Read subCMD #1) in the ready state, the memory device 110 performs a first read sensing operation (Read Sensing #1). When the first read sensing operation is performed, the memory device 110 is changed from the ready state to the second busy state. At this time, the operation of receiving the subcommand and the operation of outputting the data are not executed.

When the first read sensing operation is completed, the memory device 110 becomes the first busy state from the second busy state. Then, the memory device 110 may receive the data output sub command (Data Out subCMD) for instructing the data output operation and execute the data output operation (Data Out). When the data output operation is executed, the memory device 110 is in the first busy state.

Thereafter, the memory device 110 is changed from the first busy state to the ready state after the data output operation is completed. In the ready state, the memory device 110 may execute the second read sensing subcommand (Read subCMD #2) upon receiving the second read sensing subcommand (Read subCMD #2).

FIG. 4B is a timing diagram illustrating an operation in which a memory device reads data in accordance with a comparative example. For example, the operation of FIG. 4B may be performed by the memory controller 120 and the memory device 110 of FIG. 1.

Referring to FIG. 4B, as the time in which the data output operation is performed is increased, the time interval in which the memory device 110 is in the first busy state may be increased, compared with FIG. 4A.

When the voltage supplied to the memory device 110 is dropped, the overall operation speed of the memory device 110 is decreased and the time in which the data output operation is performed is increased.

Even if the time interval in which the memory device 110 is in the first busy state may become longer than expected, the memory controller 120 may not check whether the memory device 110 is in the first busy state.

Therefore, the memory controller 120 transmits the subcommand after a specific time according to a predefined timing. That is, the memory controller 120 is likely to transfer the inoperable subcommand in the first busy state to the memory device 110, before the memory device 110 changes from the first busy state to the ready state.

When the memory device 110 receives the second read sensing subcommand (Read subCMD #2) while the data output operation is in progress, the received sensing subcommand (Read subCMD #2) is not executable in the first busy state. Therefore, the subcommand transmitted by the memory controller 120 is not executed in the memory device 110.

FIG. 5A is a timing diagram illustrating an operation in which a memory device reads data, in accordance with an embodiment of the present invention. For example, the operation of FIG. 5A may be performed by the memory controller 120 and the memory device 110 of FIGS. 1 and 2.

Referring to FIG. 5A, when the memory device 110 receives the second read sensing subcommand (Read subCMD #2) while the data output operation (Data Out) is in progress, the memory device 110 may store the received second read sensing subcommand (Read subCMD #2) in the subcommand storage circuit 111. The memory device 110 may store the received second read sensing subcommand (Read subCMD #2) in the subcommand storage circuit 111.

When the memory device 110 is changed from the first busy state to the ready state, the memory device 110 may execute the second read sensing subcommand (Read subCMD #2) stored in the subcommand storage circuit 111. That is, the memory device 110 may perform the second read sensing operation (Read Sensing #2) in the ready state and is changed to the second busy state while executing the second read sensing operation (Read Sensing #2). Thus, the memory device 110 may execute all of the subcommands transmitted by the memory controller 120.

FIG. 5B is a timing diagram illustrating an operation in which a memory device reads data in accordance with an embodiment of the present invention. For example, the operation of FIG. 5B may be performed by the memory controller 120 and the memory device 110 of FIGS. 1 and 2.

Referring to, FIG. 5B, when the memory device 110 attempts to execute the second read sensing subcommand (Read subCMD #2) stored in the subcommand store circuit 111, the memory device 110 may receive a third read sensing subcommand (Read subCMD #3) from the memory controller 120.

In this case, the subcommand stored in the subcommand storage circuit 111 is executed prior to the subcommand received from the memory controller 120, as described above. Thus, the memory device 110 may perform the second read sensing operation (Read Sensing #2) prior to the third read sensing subcommand (Read subCMD #3).

Figure 6:
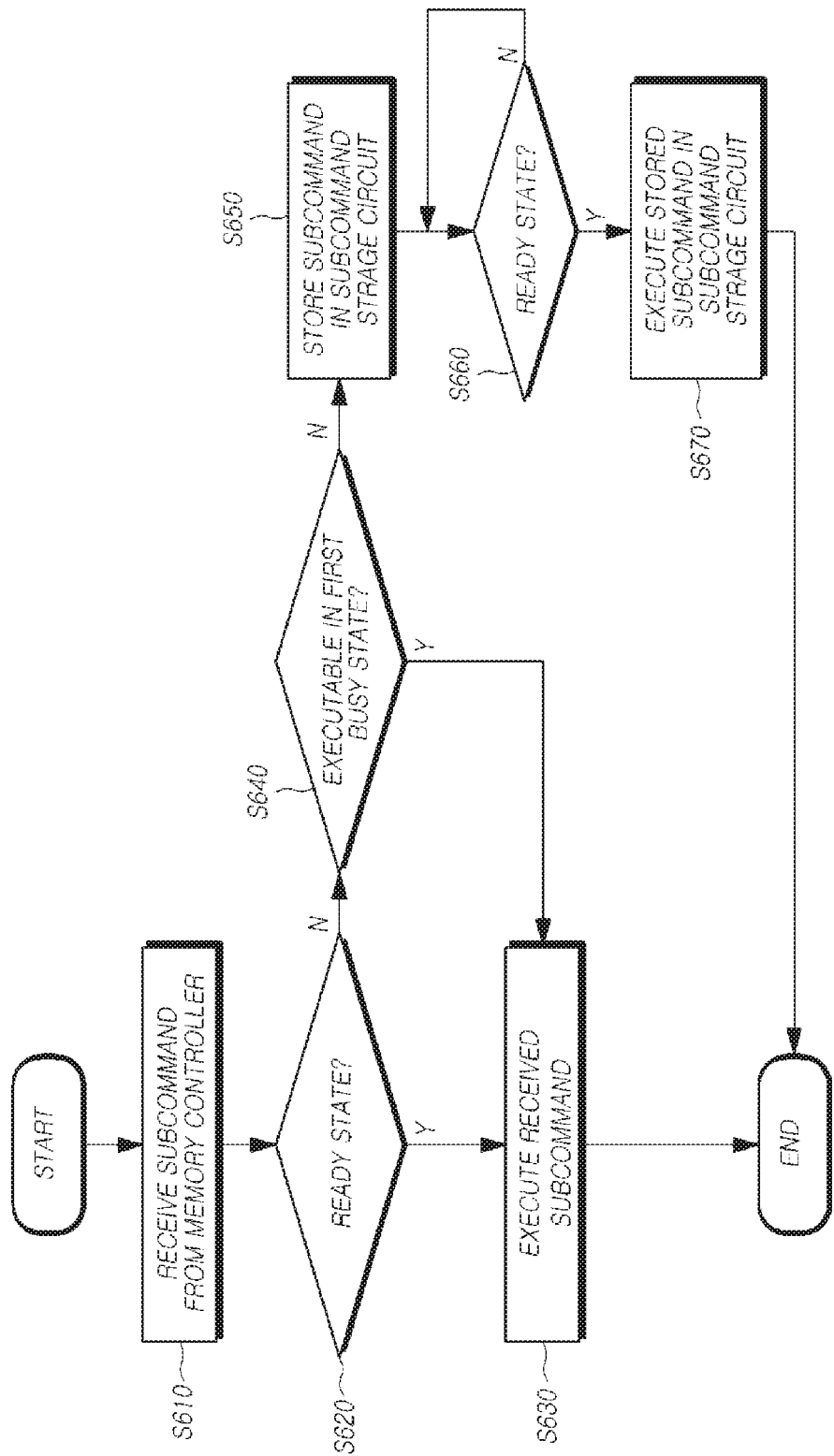
FIG. 6 is a flow diagram illustrating an operation of a memory device in accordance with an embodiment of the present invention.

FIG. 6 is a flow diagram illustrating an operation of a memory device in accordance with an embodiment of the present invention. For example, the operation of FIG. 6 may be performed by the memory controller 120 and the memory device 110 of FIGS. 1 and 2.

Referring to FIG. 6, at S610, the memory device 110 may receive a subcommand from the memory controller 120.

At S620, the subcommand processing circuit 112 of the memory device 110 determines whether the memory device 110 is in the ready state. When it is determined that the memory device 110 is in the ready state (S620, Y), the memory device 110 may execute the received subcommand. Thus, at S630, the memory device 110 may execute the subcommand received from the memory controller 120.

When it is determined that the memory device 110 is not in the ready state (S620, N), the memory device 110 determines whether the subcommand received from the memory controller 120 is executable in the first busy state at S640.

The memory controller 120 may send a subcommand to the memory device 110 when the memory device 110 is in the ready or first busy state. When the memory device 110 is in the first busy state, the memory device 110 may execute only a specific subcommand.

When it is determined that the subcommand received from the memory controller 120 is executable in the first busy state (S640, Y), the memory device 110 may execute the subcommand received from the memory controller 120 at S630. For example, when it is determined that a subcommand for instructing a data output operation may be executable (S640, Y), the memory device 110 may execute the subcommand for the data output operation described above.

When it is determined that the subcommand is not executable in the first busy state and is executable after the first busy state is released (S640, N), the subcommand processing circuit 112 of the memory device 110 may store the subcommand in the subcommand storage circuit 111 at S650.

Thereafter, at S660, the subcommand processing circuit 112 of the memory device 110 determines whether the memory device 110 is changed to the ready state. When it is determined that the memory device 110 has not been changed to the ready state, the step S660 may be executed again.

When it is determined that the memory device 110 is changed to the ready state (S660, Y), the subcommand processing circuit 112 may execute the subcommand stored in the subcommand storage circuit 111 at S670. The specific method of executing the subcommand stored in the subcommand storage circuit 111 by the subcommand processing circuit 112 may be the same as the method described with reference to FIG. 3A.

Figure 7:
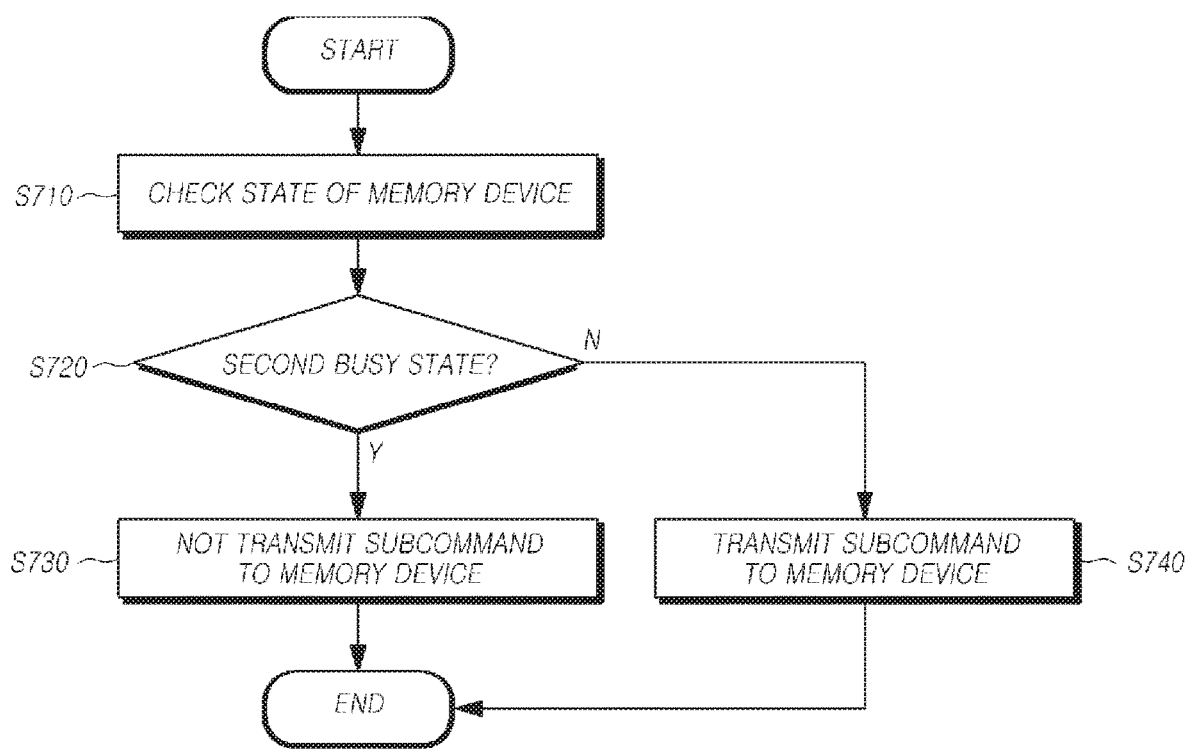
FIG. 7 is a flowchart illustrating an operation of a memory controller in accordance with an embodiment of the present invention.

FIG. 7 is a flowchart illustrating an operation of a memory controller in accordance with an embodiment of the present invention. For example, the operation of FIG. 7 may be performed by the memory controller 120 and the memory device 110 of FIGS. 1 and 2.

Referring to FIG. 7, at S710, the memory controller 120 checks the state of the memory device 110. As described above, the memory controller 120 may not confirm whether the memory device 110 is in the first busy state. The memory controller 120 may check only whether the memory device 110 is in the second busy state at S720.

At this time, the memory controller 120 may receive, from the memory device 110, a signal indicating whether the memory device 110 is in the second busy state. The memory controller 120 may determine whether the memory device 110 is in the second busy state based on the received signal from the memory device 110.

When it is determined that the memory device 110 is in the second busy state (S720, Y), the memory controller 120 does not transmit the subcommand to the memory device 110 at S730. When it is determined that the memory device 110 is not in the second busy state (S720, N), the memory controller 120 transmits a subcommand to the memory device 110 at S740.

As such, the memory controller 120 may not transmit the unnecessary subcommand to the memory device 110 in the second busy state of the memory device 110.

Figure 8:
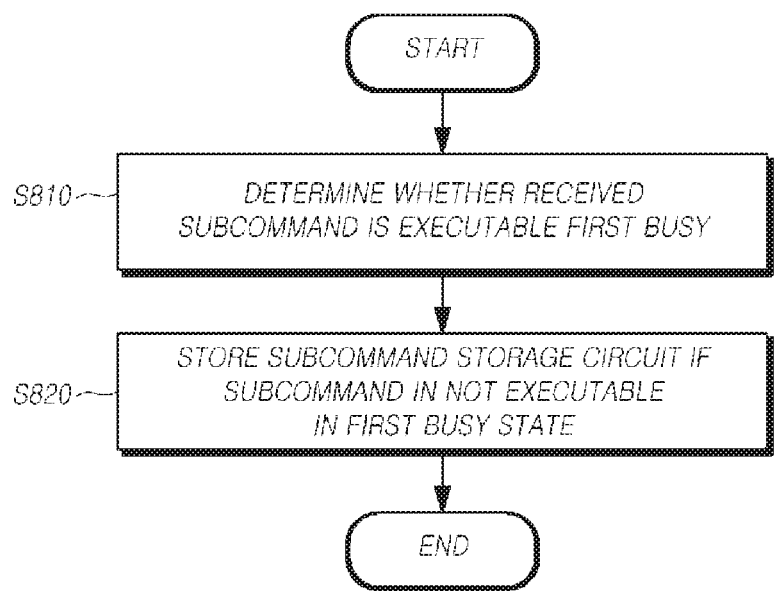
FIG. 8 is a flow diagram illustrating an operating method of a memory device in accordance with an embodiment of the present invention.

FIG. 8 is a flow diagram illustrating an operating method of a memory device 110 in accordance with an embodiment of the present invention. For example, the operation of FIG. 8 may be performed by the memory controller 120 and the memory device 110 of FIGS. 1 and 2.

Referring to FIG. 8, when the subcommand processing circuit 112 of the memory device 110 receives the subcommand from the memory controller 120 in the first busy state, the subcommand processing circuit 112 determines whether the received subcommand is executable in the first busy state at S810.

At S820, when it is determined that the received subcommand from the memory controller 120 is executable in the first busy state, the subcommand processing circuit 112 may store the received subcommand in the subcommand storage circuit 111 at S820. The specific method in which the step S820 is performed may be the same as the method described with reference to FIG. 3B.

The subcommand stored in the subcommand storage circuit 111 at S820 may be executed after the memory device 110 is changed to the ready state. The detailed method of executing the subcommand stored in the subcommand storage circuit 111 after the memory device 110 is changed to the ready state may be applied to the same method as described with reference to FIG. 3A.

Figure 9:
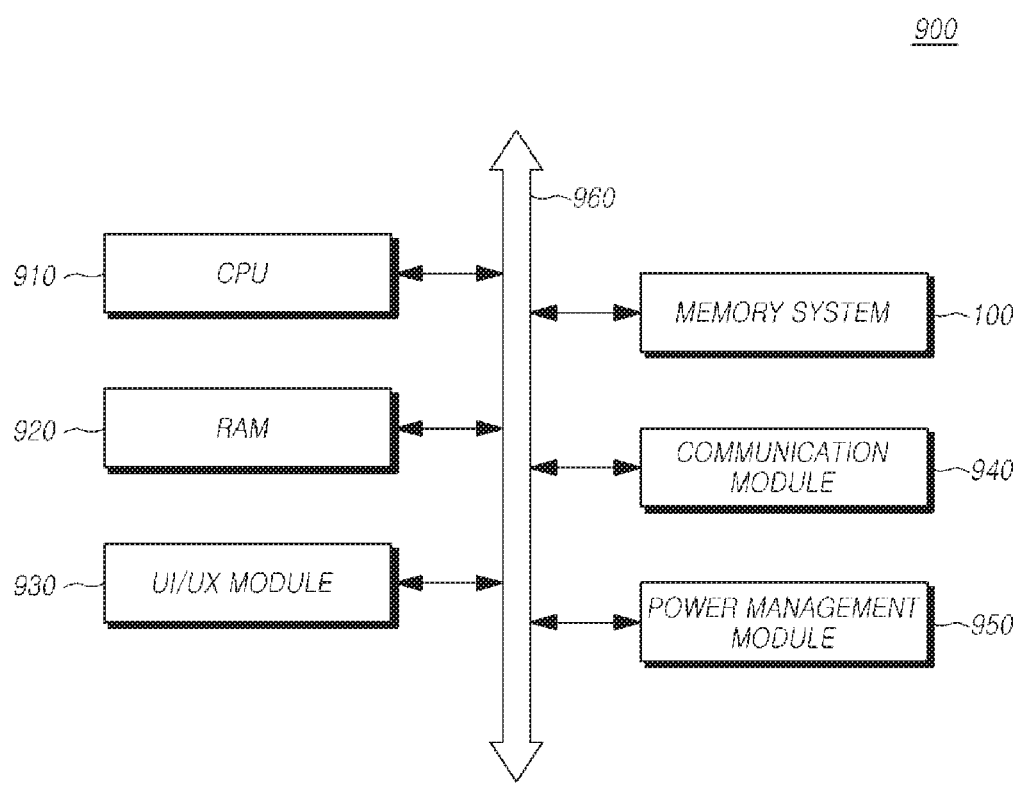
FIG. 9 is a block diagram illustrating a computing system in accordance with an embodiment of the present invention.

FIG. 9 is a block diagram illustrating a computing system 900 in accordance with an embodiment of the present invention.

Referring to FIG. 9, the computing system 900 includes a memory system 100, a central processing unit (CPU) 910, a random access memory (RAM) 920, a UI/UX module 930, a communication module 940, and a power management module 950, which are electrically connected to each other through a system bus 960.

The computing system 900 may be one of a personal computer, a mobile device such as a smart phone and tablet, or various electric devices.

The computing system 900 may further include a battery to provide an operating power. The computing system 900 may further include an application chipset, a graphic related module, a camera image processor (CIS), or a dynamic random access memory (DRAM).

The memory system 100 may be a device for storing data in non-volatile memory devices such as a solid state drive (SSD), a universal flash storage (UFS) device, an embedded multimedia card (eMMC) device, as well as a device for storing data on a magnetic disk such as a hard disk drive.

For instance, the nonvolatile memory devices may be one of a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), or a ferroelectric RAM (FRAM).

The memory system 100, the memory device 110, and the operating method thereof in accordance with the embodiments of the present invention may be implemented in various types of storage devices and may be mounted in various electronic devices.

The memory system, the memory device, and the operating method thereof in accordance with the embodiments of the present invention may minimize the possibility of malfunction that may occur due to a change in the operation timing of the memory device.

The memory system, the memory device, and the operating method thereof in accordance with the embodiments of the present invention may minimize additional logic circuitry for storing the subcommand transmitted from the memory controller.

It will be understood by those skilled in the art that the technical configurations of the disclosure described above may be embodied in other specific forms without departing from the spirit and essential characteristics of the disclosure. Therefore, it should be understood that the embodiments described above are to be considered in all respects as illustrative and not restrictive, the scope of the disclosure is indicated by the appended claims rather than the foregoing description, and all changes or modifications that come within the scope of the equivalent concept are to be construed as being included within the scope of the disclosure. Although various embodiments of the disclosure have been described using specific terms, the specification and drawings are to be regarded in an illustrative rather than a restrictive sense in time sequence to help understand the disclosure. Thus, the scope of the disclosure should not be construed as being limited to the exemplary embodiments, and rather, it should be recognized as contemplating various changes and modifications within the spirit and scope of the disclosure.

While the disclosure illustrates and describes specific embodiments, it will be apparent to those skilled in the art in light of the present disclosure that various changes and modifications may be made without departing from the spirit and scope of the invention as defined in the following claims.

What Is claimed is:

1. An operating method of a memory device, comprising:
    determining whether a subcommand among a plurality of subcommands received from a memory controller is executable in a first busy state;
    storing the subcommand in a subcommand storage circuit when it is determined that the subcommand is executable after the memory device is released from the first busy state; and
    executing the subcommand stored in the subcommand storage circuit after the state of the memory device is changed to a ready state,
    wherein the memory device has one of three states, wherein the three states are the ready state in which the plurality of subcommands are executable, the first busy state in which at least one of the plurality of subcommands are executable and a second busy state in which the plurality of subcommands are not executable.

2. The operating method according to claim 1, further comprising:
    generating and outputting, to the memory device, a signal indicating whether the memory device is in the second busy state in which the plurality of subcommands are not executable.

3. The operating method according to claim 1, wherein, when multiple subcommands are stored in a subcommand storage circuit, the multiple subcommands are executed in the order in which the multiple subcommands are stored after the memory device is changed to the ready state.

4. The operating method according to claim 1, wherein a stored subcommand in a subcommand storage circuit is preferentially executed when the stored subcommand and a received subcommand from the memory controller are to be executed simultaneously.

5. A memory system, comprising:
    a memory device comprising a plurality of memory blocks and a subcommand storage circuit; and
    a memory controller for controlling the memory device and providing a plurality of subcommands to the memory device,
    wherein the memory device has one of three states, wherein the three states are a ready state in which the plurality of subcommands are executable, a first busy state in which at least one of the plurality of subcommands is executable, and a second busy state in which the plurality of subcommands are not executable, and wherein, when a subcommand is received from the memory controller in the first busy state,
the memory device stores the subcommand in the subcommand storage circuit which is included in the memory device when the subcommand is executable after the memory device is released from the first busy state; and executes the subcommand stored in the subcommand storage circuit after state of the memory device is changed to the ready state.

6. The memory system according to claim 5, wherein the memory device generates and outputs, to the memory controller, a signal indicating whether the memory device is in the second busy state.

7. The memory system according to claim 6, wherein the memory controller determines whether the memory device is in the second busy state based on the signal.

8. The memory system according to claim 7, wherein the memory controller does not transmit the subcommand to the memory device when the memory device is in the second busy state.

9. The memory system according to claim 5, wherein, when multiple subcommands are stored in the subcommand storage circuit, the memory device executes the multiple subcommands in a time sequence in which the plurality of the subcommands are stored in the subcommand storage circuit after the memory device is changed to the ready state.

10. The memory system according to claim 5, wherein the memory device preferentially executes a first subcommand stored in the subcommand storage circuit when the first subcommand and a second subcommand received from the memory controller are to be executed simultaneously.

11. The memory system according to claim 5, wherein the memory device determines that the subcommand is executable in the first busy state when the subcommand is a subcommand for instructing a data output operation.

12. The memory system according to claim 5, wherein the memory device is changed to the second busy state when executing a subcommand for instructing a read sensing operation.

13. The memory system according to claim 5, wherein the memory device is changed to the first busy state when executing a subcommand for instructing a data output operation.

14. The memory system according to claim 5, wherein the subcommand storage circuit comprises one or more registers.

15. A memory device, comprising:
a plurality of memory blocks;
a subcommand storage circuit for storing one or more subcommands; and
a subcommand processing circuit for processing the subcommands,
wherein the memory device has one of three states, wherein the three states are a ready state in which the subcommands are executable, a first busy state in which at least one of the subcommands is executable, and a second busy state in which the subcommands may are not executable, and
wherein, when the subcommand processing circuit receives a subcommand from a memory controller in the first busy state, the subcommand processing circuit stores the subcommand in the subcommand storage circuit when the subcommand is executable after the memory device is released from the first busy state and is executed after state of the memory device is changed to the ready state.

16. The memory device according to claim 15, wherein the subcommand processing circuit generates and outputs, to the memory controller, a signal indicating whether the memory device is in the second busy state.

17. The memory device according to claim 15, wherein, when multiple subcommands are stored in the subcommand storage circuit, the subcommand processing circuit executes the multiple subcommands in the order in which the multiple subcommands are stored in the subcommand storage circuit after the memory device is changed to the ready state.

18. The memory device according to claim 15, wherein the memory device preferentially executes a first subcommand stored in the subcommand storage circuit when the first subcommand and a second subcommand received from the memory controller are to be executed simultaneously.

19. The memory device according to claim 15, wherein the subcommand storage circuit comprises one or more registers.

* * * * *